| United States Patent [19] | [11] | 4,434,256 |
|---|---|---|
| Dworak et al. | [45] | Feb. 28, 1984 |

[54] PAINT BINDERS

[75] Inventors: Gert Dworak; Werner Staritzbichler, both of Graz, Austria

[73] Assignee: Vianova Kunstharz, A.G., Werndorf, Austria

[21] Appl. No.: 406,859

[22] Filed: Aug. 10, 1982

Related U.S. Application Data

[63] Continuation of Ser. No. 87,345, Oct. 23, 1979, abandoned.

[30] Foreign Application Priority Data

Oct. 31, 1978 [AT] Austria ................... 7763/78

[51] Int. Cl.$^3$ ................... C08G 59/40; C08L 63/00
[52] U.S. Cl. ................... 523/402; 523/416; 523/424; 525/286; 525/340; 525/502; 525/507; 528/108; 528/365; 528/398
[58] Field of Search ................... 523/402, 424, 416; 528/108, 365, 398; 525/286, 340, 507, 502

[56] References Cited

U.S. PATENT DOCUMENTS

| 2,732,367 | 1/1956 | Shokal ................... 260/47 |
| 3,364,159 | 1/1968 | Hecker et al. ................... 260/18 |
| 3,405,075 | 10/1968 | Welch et al. ................... 260/2 |
| 3,578,632 | 5/1971 | Kuhlkamp et al. ................... 260/47 |
| 4,164,487 | 4/1979 | Martin ................... 260/29.2 EP |

*Primary Examiner*—Earl A. Nielsen
*Attorney, Agent, or Firm*—A. W. Breiner

[57] ABSTRACT

Paint binders which are water soluble upon neutralization with bases comprising the reaction product of a polyepoxide containing reactive oxirane groups with phosphonic acids containing hydroxyl and/or vinyl groups. The paint binders when stoved at low temperatures have increased chemical resistance.

9 Claims, No Drawings

PAINT BINDERS

This is a continuation of application Ser. No. 087,345 filed Oct. 23, 1979, now abandoned.

This invention is directed to paint binders and more particularly to paint binders water soluble upon neutralization with basic materials comprising the reaction product of polyepoxides with phosphonic acids containing primary hydroxyl groups and/or vinyl groups.

DE-OS No. 27 57 733 discloses epoxy resin-phosphoric acid esters, water soluble upon neutralization with bases, and their use in paint binders. The resistance characteristics of the coatings prepared therefrom are not satisfactory when cured at the lower range of conventional stoving temperatures.

According to the present invention it has been found that the performance of epoxy resin-phosphonic acid esters can be improved if the cross-linking density of the stoved paint film is increased through the use of primary hydroxyl group and vinyl group containing phosphonic acids as esterification components. The paint binders of this invention, soluble upon neutralization with bases, are characterized in that the binder is prepared by reacting a polyepoxide resin at 10° to 160° C., preferably between 30° and 80° C., with 0.12 to 1 mole of phosphonic acid of the general formula

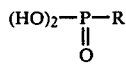

wherein R stands for $-CH_2OH$; $-CH_2-CH_2-OH$; $-CH=CH_2$ or $-CH_2-CH=CH_2$ per mole of oxirane groups. Optionally, other compounds containing epoxy reactive groups can be present up to 0.6 mole of the oxirane groups in the epoxy compound.

The particularly preferred compounds to be used herein are the polyglycidyl ethers of polynuclear phenols, e.g., methylene bisphenol, isopropylidene bisphenol, and polyphenols linked novolak-like by methylene bridges. Additional suitable compounds are the polyglycidyl ethers of polyvalent alcohols or hydroxy-rich intermediate condensates of the polyester type. Further, monopolymers of epoxy group containing unsaturated monomers or copolymers of such monomers with other alpha,beta-ethylenically unsaturated monomers are also suitable. Other useful polyepoxides are the epoxidation products of olefinically unsaturated compounds such as unsaturated vegetable oils or diene polymers, preferably polybutadiene.

The phosphonic acids having the general formula

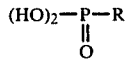

useful herein include hydroxy methane phosphonic acid ($R=-CH_2OH$), hydroxy ethane phosphonic acid ($R=-CH_2-CH_2-OH$), vinyl phosphonic acid ($R=-CH=CH_2$), and allyl phosphonic acid ($R=-CH_2-CH=CH_2$). The phosphonic acids are preferably used as aqueous solutions.

The quantity of the phosphonic acid to be used is governed by the molecular weight of the resin-like epoxy component (considering eventual modification steps) and is chosen in order that the reaction product upon sufficient neutralization is clear to opalescent and soluble in water. To accomplish the above objective, normally 0.12 to 1 mole, preferably 0.14 to 0.4 mole, of phosphonic acid are required per mole of oxirane group, the acid number thereby attaining from 12 to 300 mg KOH/g. The preferred products have an acid value range of from 20 to 80 mg KOH/g.

The temperature for the reaction ranges between about 10° and 160° C., preferably 30° to 80° C. The reaction is exothermic. In particular, polyepoxides with high epoxy functionality require slow feed of the epoxy component to the charged phosphonic acid. Normally, a rise in intrinsic viscosity above the starting values of the reaction partners can be observed. In general the presence of solvents is preferred since the reaction can thus be controlled more easily. The obtained product, for securing optimum stability, should not contain any intact or unreacted epoxy groups. This can be achieved either by using equimolar amounts of reaction partners or, with an excess of oxirane groups, by prolonging the reaction time.

Compounds with epoxy-reactive groups which can optionally be used besides the phosphonic acids include carboxylic acids such as the fatty acids of vegetable oils, rosin acids, benzoic acid, dimethylol propionic acid, adipic acid, fumaric acid, dimerized oil fatty acids, polybutadiene with chain end carboxyl functionality and the like. Other modifying reactants are the mono- or dialcohols or mono- or diphenols or their reaction products with formaldehyde which react with the polyepoxide with the formation of ethers. If the polyepoxides carry hydroxy groups, stemming either from the production process or from modification reactions, they will provide sites for additional modification by linking the hydroxy groups as urethane linkages with isocyanate containing reaction partners. The reactions and conditions for these modification reactions are known to those skilled in the art.

The reaction products according to the present invention can optionally be combined with heat-hardening binders such as formaldehyde condensation products of phenols, substituted phenols, urea, melamine, acetoguanamine, benzoguanamine and glycoluril. The heat-hardening components are used at a level of from 2-40 parts on 98 to 60 parts of the epoxide-phosphonic acid reaction product. They can be present as mixtures or partial reaction products with the reaction products of the invention. The partial condensation is carried out at temperatures of from 50° to 120° C., and is monitored via the viscosity and/or increasing dilutability with water. It is evident that the partial condensation reaction should not be carried to a state beyond solubility.

Basic materials suitable for neutralization of the epoxide-phosphonic acid paint binders are alkali hydroxides, ammonia, aliphatic and cycloaliphatic amines or alkanolamines. The coating compositions can be used as clear varnish or as pigmented paints. Pigmentation can be effected, prior to or after the neutralization step, with any normal equipment. The coating compositions can be applied by dipping, spraying, flow coating or anodic electrodeposition. Those products based on glycidyl ethers of polynuclear phenols are particularly suitable for use as primers or intermediate coats whereas, for finishes, the weather-resistant acrylic copolymers are preferred.

The following examples illustrate the invention. Parts and percentages are by weight, if not otherwise stated.

EXAMPLE 1

44.8 g (0.4 mole) of hydroxymethane phosphonic acid, 15.8 g of water and 30.4 g of methylethylketone are heated to 70° C. and, while stirring, a solution of 300 g of methylethylketone and 475 g (1.0 mole oxirane groups) of a diepoxy resin based on Bisphenol-A (Durran melting point 64° to 74° C., hydroxyl value=OH mole/100 g of 0.32) is added in portions. The temperature is held until the oxirane group content (according to Jung and Kleeberg, Kunststoffe 51, 714, 1966) has fallen to 0. The condensation product has an acid value of 44 mg KOH/g and is clearly soluble in water upon neutralization of the acid groups with triethylamine.

EXAMPLE 2

As described in Example 1, 25.2 g (0.2 mole) of hydroxyethane phosphonic acid, dissolved in 8.8 g of water and 69 g of methylethylketone are condensed at 70° to 75° C. with 475 g of the epoxy resin described in Example 1, dissolved in 256 g of methylethylketone. The reaction product has an acid value of 14 mg KOH/g and is substantially soluble in water upon neutralization with ammonia.

EXAMPLE 3

190 g (1 mol oxirane groups) of a liquid diepoxy resin on Bisphenol-A basis are esterified at 180° C. with 56 g (0.2 mole) of linseed oil fatty acids to an acid value of below 3 mg KOH/g and dissolved in 105 g of methylethylketone (solids content 75%). 351 g of the epoxy resin ester thus prepared are added in portions at 70°–75° C. to a solution of 27 g (0.25 mole) of vinylphosphonic acid in 9.4 g of water and 67.3 g of methylethylketone. The reaction is carried to an oxirane content of zero. The product has an acid value of 51 mg KOH/g and gives a stable aqueous solution upon neutralization of the acid groups to the extent of 80%.

EVALUATION OF THE BINDERS OF EXAMPLES 1, 2 AND 3 IN STOVING PAINTS

A pigmented paste is prepared from 80 parts of each of the binders, based on resin solids; 40 parts of a 50% solution of a Bisphenol-A resol having limited dilutability with water; 50 parts of $TiO_2$; 50 parts of Blanc fixe, and 0.15 parts of carbon black. The paste is neutralized with triethylamine, i.e., 10 parts for Example 1, 5.5 parts for Example 2, and 11 parts for Example 3; and diluted with water to a solids content of 47%.

The paints are applied to passivated steel panels and cured at 160° C. for 20 minutes. The resulting paint films have a dry film thickness of 30±2 μm.

In the manner as above described a comparison paint is prepared according to Example 1 of DE-OS No. 27 57 733 with a phosphoric acid ester and applied to a steel panel and cured as above stated.

When tested, the following results are obtained:

|  | Salt Spray[1] Hours | Combined Gravel and[2] Salt Spray Test |
|---|---|---|
| Paint of Example 1 | 600 | 5% |
| Paint of Example 2 | 720 | 5% |
| Paint of Example 3 | 552 | 7% |
| Comparison Paint | 288 | 28% |

[1]ASTM B 117-64; paint comes off 1-2 mm at the cross incision after the stated hours.
[2]At an angle of 45°, 500 g of hail-shot (4-5 mm) are shot at the paint (pressure 2 atu) and the paint is exposed for 120 hours to salt spray (ASTM B117-64). After rinsing with water and drying, the rusty parts of the paint are covered with adhesive tape which is then torn off. The paint is judged by photometrical measurement and the proportion of torn off paint (free metal surface) is quoted as percentage of the whole shot-at surface.

It is claimed:

1. Paint binders comprising an aqueous solution formed by the neutralization of the reaction product obtained by slowly adding a polyepoxide containing reactive oxirane groups dissolved in an inert solvent to an aqueous solution of a phosphonic acid, said aqueous solution containing about 0.12 to 1 mole of phosphonic acid per mole of oxirane group, with a base selected from the group consisting of alkali hydroxides, ammonia, aliphatic amines, cycloaliphatic amines, and alkanolamines, said phosphonic acid having the formula

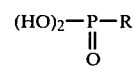

wherein R stands for $-CH_2OH$, $-CH_2-CH_2-OH$, $-CH=CH_2$ or $-CH_2-CH=CH_2$; said binders having a high degree of cross-linking density.

2. The paint binders of claim 1 wherein the reaction product includes compounds other than the phosphonic acid having epoxy reactive groups in an amount up to 0.6 moles per mole of oxirane group.

3. The paint binders of claim 1 wherein the phosphonic acid is present in an amount of 0.14 to 0.4 moles of oxirane group.

4. A process for producing aqueous paint binders comprising slowly adding a polyepoxide containing reactive oxirane groups dissolved in an inert solvent to an aqueous solution of a phosphonic acid, said aqueous solution containing about 0.12 to 1 mole of phosphonic acid per mole of oxirane groups, said phosphonic acid having the formula

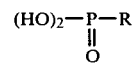

wherein R stands for $-CH_2OH$, $-CH_2-CH_2-OH$, $-CH=CH_2$ or $-CH_2-CH=CH_2$ at a temperature of from about 10° to 160° C. until substantially all of the oxirane groups are reacted, and thereafter neutralizing the reaction product of said polyepoxide and phosphonic acid with a base selected from the group consisting of alkali hydroxides, ammonia, aliphatic amines, cycloaliphatic amines, and alkanolamines, said binder so produced having a high degree of cross-linking density.

5. The process of claim 4 wherein said reaction is carried out at a temperature of from about 30° to 80° C.

6. The process of claim 5 wherein there is present, in addition to the phosphonic acid, compounds having epoxy-reactive groups, said additional epoxy-reactive group containing compounds being present at up to 0.6 moles per mole of oxirane group.

7. The process of claim 5 wherein the phosphonic acid is present at from 0.14 to 0.4 moles per oxirane group.

8. The process of claim 5 wherein a solution of the polyepoxide in an inert solvent is slowly added to an aqueous solution of the phosphonic acid.

9. An aqueous solution comprising the neutralization product of a polyepoxide containing reactive oxirane groups reacted with from about 0.12 to 1 mole of phosphonic acid per mole of oxirane group, said phosphonic acid having the formula

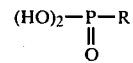

wherein R stands for —CH$_2$OH, —CH$_2$—CH$_2$—OH, —CH=CH$_2$ or —CH$_2$—CH=CH$_2$.

* * * * *